United States Patent [19]

Kozloski et al.

[11] Patent Number: 5,110,469
[45] Date of Patent: May 5, 1992

[54] COFFEE GROUNDS DISPOSAL UNIT

[75] Inventors: Edward A. Kozloski, Babylon; Eric Seger, Wantagh; Walter E. Howard, Brewster; James R. Weldon, New York, all of N.Y.

[73] Assignee: Kraft General Foods, Inc., Glenview, Ill.

[21] Appl. No.: 546,357

[22] Filed: Jun. 29, 1990

[51] Int. Cl.$^5$ .............................................. B01D 35/02
[52] U.S. Cl. .................................... 210/455; 210/464; 210/472; 210/475; 210/477; 99/289 R
[58] Field of Search ............. 99/289 R; 210/455, 464, 210/472, 474, 475, 477, 244

[56] References Cited

U.S. PATENT DOCUMENTS

| | | | |
|---|---|---|---|
| 463,505 | 11/1891 | Glynn | 210/464 |
| 868,075 | 10/1907 | Cody | 210/464 |
| 1,313,992 | 8/1919 | James | 210/244 |
| 1,800,093 | 4/1931 | Menge | 210/472 |
| 2,999,560 | 9/1961 | Seefluth | 210/472 X |
| 3,007,392 | 11/1961 | Pecoraro et al. | |
| 3,345,935 | 10/1967 | Waline | |
| 3,365,063 | 1/1968 | Cobb et al. | |
| 3,683,790 | 8/1972 | Black et al. | |
| 4,603,621 | 8/1986 | Roberts | |
| 4,744,291 | 5/1988 | Wallin | |
| 4,773,313 | 9/1988 | Anson | |
| 4,846,970 | 7/1989 | Bertelsen et al. | |
| 4,872,402 | 10/1989 | Johnson et al. | |
| 4,873,915 | 10/1989 | Newman et al. | |
| 4,909,136 | 3/1990 | Newman et al. | |

*Primary Examiner*—Charles Hart
*Attorney, Agent, or Firm*—Thomas A. Marcoux; Thomas R. Savoie; Linn I. Grim

[57] ABSTRACT

A coffee grounds disposal and strainer arrangement adapted to be utilized in conjunction with the operation of an automatic coffee brewer. A lid member covering the receptacle receiving the hot liquid or water and entrained spent coffee grounds from the coffee brewer is equipped with a plurality of venting apertures which will allow steam generated by the hot liquid in the receptacle channel to escape upwardly through the apertures. A U-shaped channel structure is formed on the upper ends of the receptacle sidewalls receives the lid flange. Hereby, any condensate liquid flowing down the flange from the inside of the lid member, which condensate is formed from steam emanating from the hot liquid in the receptacle will tend to collect in the U-shaped channel intermediate the lid member and the receptacle, thereby preventing such liquid or water from flowing outwardly and down the receptacle onto the table or counter top. In order to preclude residual coffee liquid from spilling out of the liquid discharge outlet connector arranged in the bottom level of the receptacle upon the disconnecting of the drainage hose when it is desired to empty the receptacle of accumulated spent coffee grounds, the outlet connector or conduit is provided with a swivel coupling. The coffee brewer may also be equipped with a positioning device mounted on the coffee brewer supporting legs beneath the brewer, and located in the space above the counter or table top from which the coffee brewer is supported, so as to enable the coffee grounds disposal unit to be slid between guide brackets of the positioning device to a location in which the inlet port of the lid of the grounds disposal unit is in alignment with the waste discharge nozzle of the coffee brewer.

28 Claims, 7 Drawing Sheets

COFFEE GROUNDS DISPOSAL UNIT

BACKGROUND OF THE INVENTION

1. Field of the Invention

The present invention relates to a coffee grounds disposal unit and, more particularly, relates to a coffee grounds disposal and strainer arrangement adapted to be utilized in conjunction with the operation of an automatic coffee brewer.

The installation of automatic coffee brewers or makers for the preparation of large quantities of freshly brewed coffee in a substantially continuously repetitive manner over length periods of time has found widespread applications in industrial and commercial facilities, such as offices and factories, various types of restaurants or food retailing establishments, and in country clubs, social halls, among other similar establishments. Hereby, it is a primary intent of such kind of facility to be able to serve freshly brewed coffee to a large number of consumers without the need of having to frequently discontinue the operation of the coffee brewer or maker in order to have to discard spent coffee grounds and to replenish the supply of coffee and brewing liquid thereto, so as to thereby allow for a practically undisrupted and continuous operation of the coffee brewer to satisfy the needs of the consumers normally employing the services of such coffee brewers.

Heretofore, large-sized coffee brewers for rendering available freshly brewed coffee on a so-called commercial scale included large upright canisters or urns for receiving a requisite quantity of water, and with the ground coffee being poured into a perforated brewing basket in order to produce a coffee brew, normally through a percolating process. The brewed coffee was thereafter dispensed through operation of a suitable faucet into either smaller easily handled serving pots, or even directly into coffee cups. In order to ready the urn-like coffee maker for the preparation of a subsequent coffee brewing cycle after the emptying thereof, this normally necessitated the manual removal of the basket containing the moist spent coffee grounds, discarding the grounds and washing the basket the rinsing out of the interior of the coffee urn, and the manual refilling thereof with water and inserting the basket with fresh ground coffee. This entailed employing a cumbersome procedure frequently resulting in spillage and dripping of liquid from the strainer basket containing the spent wet coffee grounds and possible dripping of residual coffee liquid from the serving faucet of the coffee urn. As a result, this produced an unsightly stain and puddle on a counter or table top on which the coffee urn was normally positioned.

More recently, in lieu of such manually filled and operated coffee urns, automatic coffee brewers of various sizes have found favor, and which to a considerable extent have eliminated the need for the frequent repetitive manual filling of the coffee brewer and the discarding of the wet spent coffee grounds therefrom. Hereby, the automatic coffee brewers internally incorporate apparatus for heating quantities of water received from a water supply source, and possess hoppers or receptacles which are filled with various types of coffee which are administered to specified quantities of heated water in dosed amounts so as to produce requisite quantities of freshly brewed coffee, which the coffee brewer then automatically dispenses into suitable coffee pots through dispensing nozzles.

In general, such automatic coffee brewers, particularly those of the large-sized commercial type, incorporate operator-actuatable cleaning/scavenging cycles whereby, subsequent to the brewing, a flow of hot water is admixed with the spent coffee grounds and flushed downwardly out of the coffee brewer through a suitable waste discharge nozzle or orifice into a suitable coffee grounds disposal unit positioned below the coffee brewer. Normally, such a coffee grounds disposal unit consists of a closed receptacle or containment structure wherein the discharge nozzle of the brewer for the hot scavenging liquid and spent coffee grounds causes this material to expelled through an inlet portion provided in a cover or lid of the receptacle of coffee grounds disposal unit, and therein to undergo a filtering or straining action which will cause the hot liquid to be discharged from the coffee grounds disposal unit into a suitable liquid drainage locale, such as a drainage sink or drain hole, and wherein the filter or strainer will inhibit the passage therethrough of the wet spent coffee grounds and cause these to be collected in the receptacle of the coffee grounds disposal unit. The latter is sized so as to enable the cumulative collection of spent coffee grounds from a considerable number of brewing cycles and waste discharges from the coffee brewer with which it is operatively associated. Thereby, this will extensively reduce the number of times in which the coffee brewer must be deactivated in order to allow for the emptying and cleaning of the coffee grounds disposal unit, while concurrently largely eliminating the danger of spillage of coffee liquid and spent coffee grounds.

Although, in general, coffee grounds disposal units which receive hot water or liquid having the spent coffee grounds entrained therein from automatic coffee brewers are considered generally satisfactory in use, and essentially meet their objectives in eliminating the need for the frequent manual handling of earlier coffee urns in order to dispose of the spent coffee grounds, they are, nevertheless, subject to some functional limitations and drawbacks. Thus, currently employed coffee grounds disposal and strainer units of the type considered herein allow for steam produced by the hot flushing liquid entering the disposal unit from the coffee brewer to egress along the juncture between the receptacle of the disposal unit into which the hot liquid and spent coffee grounds are flushed from the coffee brewer and the covering lid structure superimposed thereon. This will cause condensate liquid formed from the steam to flow down along the exterior surfaces of the receptacle of the coffee grounds disposal unit, and produce unsightly water puddles in the area surrounding the disposal unit and the coffee brewer. Moreover, the discharge of the hot liquid or water from the disposal unit in which the spent coffee grounds have previously been separated and collected in the receptacle of the grounds disposal unit, is generally effected through a horizontal outlet conduit communicating with the bottom level of the receptacle wherein such liquid tends to collect, and with a hose being connected to the outlet conduit for draining such liquid into a drainage facility; for example, a sink or drain hole located in the vicinity of the coffee brewer. However, when it is desired to empty the spent coffee grounds from the receptacle of the coffee grounds disposal unit, the hose is normally uncoupled or disconnected from the outlet conduit which communicates with the receptacle, and the entire receptacle is manually carried to a suitable waste disposal bin where the coffee ground contents are emptied therein, and the receptacle may then be subsequently rinsed and dried for subsequent reemployment below a coffee brewer. The uncoupling of the drainage hose from the outlet conduit frequently causes residual liquid which has collected in the bottom of the receptacle to spill or drip out of the horizontal outlet conduit, thereby producing unsightly and staining puddles of coffee-colored liquid residues on the surface of a table or counter top on which the coffee brewer is located. This imparts a unattractive and dirty appearance to the entire facility, and particularly in establishments, like coffee shops for example, where such coffee brewers are positioned exposed to public viewing by customers, this may adversely influence the customers opinion over the quality of the restaurant or establishment serving the coffee.

In order to ameliorate or even eliminate the drawbacks encountered in coffee ground disposal and strainer units of the type described herein, the present invention contemplates as an improvement thereto that such disposal units be equipped with features which will eliminate the potential for unsightly spilling of condensate water from the hot liquid or water flushed into the disposal unit from the coffee brewer, and also largely eliminate the potential for spillage of residual amounts of coffee-like liquid from the lower receptacle portion of the coffee grounds disposal unit upon uncoupling of the drainage hose for purposes of emptying the unit of its spent coffee ground contents. The foregoing is achieved in that the lid member covering the receptacle receiving the hot liquid or water and entrained spent coffee grounds from the coffee brewer is equipped with a plurality of venting apertures which will allow steam generated by the hot liquid in the receptacle to escape upwardly through the apertures. Hereby, the coffee grounds disposal unit is ordinarily arranged below the bottom plate of an automatic coffee brewer which is elevated or raised above a support surface, such as a table or counter top, through the intermediary of spaced legs, and wherein the bottom of the coffee brewer normally incorporates a hot plate for maintaining pots of coffee in a heated or warming condition subsequent to the dispensing of coffee thereinto from the coffee brewer. Consequently, the hot plate will concurrently serve to vaporize such steam and prevent it from streaming down the outer surfaces of the coffee grounds discharge unit onto the counter top.

In addition to the foregoing, along the peripheral juncture between the upper ends of the sidewalls of the receptacle receiving the hot liquid and the therein entrained spent coffee grounds from the coffee brewer, and the downwardly depending mating flange structure of the lid member superimposed thereon, a U-shaped channel structure is formed on the upper ends of the sidewalls into which there engage the flange on the lid member formed on the upper ends of the receptacle sidewalls. Hereby, any condensate liquid flowing down the flange from the inside of the lid member, which condensate is formed from steam emanating from the hot liquid in the receptacle will tend to collect in the U-shaped channel intermediate the lid member and the receptacle, thereby preventing such liquid or water from flowing outwardly and down the receptacle onto the table or counter top. This, to a large extent, will eliminate the formation of water puddles and coffee stains in the areas surrounding the coffee brewer and/or coffee grounds disposal unit, thereby enabling the appearance of the counter top to remain clean and attractive.

In addition to the foregoing, in order to preclude residual coffee liquid from spilling out of the liquid discharge outlet connector arranged in the bottom level of the receptacle upon the disconnecting of the drainage hose when it is desired to empty the receptacle of accumulated spent coffee grounds, the outlet connector or conduit is provided with a swivel coupling which, during the operation of the coffee brewer and the arrangement of the coffee grounds disposal unit therebeneath, is pivoted into a horizontal position so as to cause the flow through the connector into the hose to be at a level coinciding with the lowest level of the receptacle, thusly ensuring that practically all of the scavenging liquid or hot water flushed into the receptacle from the coffee brewer will flow out through the drainage hose. However, when it is desired to empty the receptacle of the coffee grounds disposal unit of its accumulated coffee grounds content, the swivel coupling may be pivoted upwardly so as to provide an elevated vertically oriented discharge opening upon separation of the drainage hose therefrom, which is conducive towards preventing any residual liquid contained in the receptacle from spilling out through the discharge outlet connector upon removing the receptacle from its position beneath the coffee brewer and any slight tilting thereof. Again, this will preclude the spillage of residual brewed coffee liquid and assist in maintaining the counter top in a clean condition presenting a neat appearance.

Furthermore, the coffee brewer may also be equipped with a positioning device in the form of a lateral bar and guide bracket members mounted on the coffee brewer supporting legs beneath the brewer, and located in the space above the counter or table top from which the coffee brewer is supported, so as to enable the coffee grounds disposal unit to be slid between the guide brackets of the positioning device to a location in which the inlet port of the lid of the grounds disposal unit is in alignment with the waste discharge nozzle of the coffee brewer for the receipt of the hot flushing water or liquid and entrained spent coffee grounds.

2. Discussion of the Prior Art .

Although various types of structures which are somewhat similar in operation and configuration are present in the art, none of these provide for the advantages afforded by and contemplated by the present invention.

Waline U.S. Pat. No. 3,345,935 discloses a multi-sectioned disposable coffee brewing bag and basket which is adapted to be positioned in a receptacle and to have hot water passed therethrough to provide a coffee brew of specified consistency. There is no disclosure of the unique coffee grounds disposal unit embodying the inventive features as contemplated herein.

Similarly, Bertelsen, et al. U.S. Pat. No. 4,846,970 discloses a cross-flow filtration membrane unit in which a liquid is adapted to flow through a closed receptacle in order to separate solids therefrom. There is no disclosure of a unique coffee grounds disposal and strainer unit analogous to that contemplated by the invention.

Pecoraro, et al. U.S. Pat. No. 3,007,392 discloses a canister for producing beverages in which a filter pack containing coffee is loaded into a receptacle and supported on a metal plate, with a lid member thereafter being sealingly closed thereover through the action of a sealing lever, and a hot water flow infused through the coffee so as to cause the latter to be filtered along small openings along the edge of the plate downwardly through a discharge orifice. There is no disclosure of the particular separation of spent coffee grounds from a hot scavenging liquid analogous to that contemplated by the present invention.

Finally, Cobb, et al. U.S. Pat. No. 3,365,063 discloses a filter unit for a washing machine in which a flow of wash water is passed through a filter to have lint and other fabric constituents separated therefrom. There is no disclosure of a unique coffee grounds disposal and strainer unit analogous to that provided for by the present invention.

SUMMARY OF THE INVENTION

Accordingly, it is an object of the present invention to provide a coffee grounds disposal and strainer unit for enabling the essentially continuous separation of hot flushing liquid and entrained spent coffee grounds.

A more specific object of the present invention is to provide a coffee grounds disposal arrangement of the type described, in which steam produced by hot scavenging liquid flushed into the unit from the brewer is vented through suitable apertures provided in the lid member, and wherein structure is provided intermediate the juncture between the lid member and the receptacle receiving the hot liquid and spent coffee grounds to inhibit the escape therethrough of condensate formed from steam generated by the hot liquid.

Still another object of the present invention is to provide a discharge outlet connector or conduit for the hot liquid from the coffee grounds disposal arrangement, incorporating a swivel coupling which, in one operative position thereof, will enable the practically complete discharge of hot liquid flushed through the disposal unit, whereas in the inoperative detached condition of a drainage hose for the liquid from the unit, the swivel coupling is pivoted upwardly into a vertical outlet orientation to provide an elevated opening relative to the bottom of the receptacle outlet and inhibiting the spillage of any residual liquid from the disposed unit.

Yet another object of the present invention is to provide a device for positioning and guiding the coffee grounds disposal unit beneath a coffee brewer in order to align a waste discharge nozzle for waste liquid and spent coffee grounds expelled from the brewer into alignment with an inlet port in a lid member of the coffee grounds disposal unit so as to preclude the inadvertent spillage of the liquid and coffee grounds during discharge therefrom from the coffee brewer into the coffee grounds disposal unit.

BRIEF DESCRIPTION OF THE DRAWINGS

The foregoing and other objects and advantages of the invention may now be more readily ascertained from the following detailed description of an exemplary embodiment of the novel coffee grounds disposal and strainer unit, taken in conjunction with the accompanying drawings; in which.

DETAILED DESCRIPTION

Reverting now in more specific and greater particularity to the drawings, and especially FIGS. 1 through 6, FIG. 1 illustrates, in a generally schematic representation, a coffee grounds disposal arrangement 10 which is positioned beneath a large-sized commercial automatic coffee brewer 12, the latter of which is supported in a raised condition through the intermediary of legs on a suitable horizontal support surface, such as a table or counter top, commonly employed in the kitchen or food/beverage installations of industrial facilities and offices, various types of restaurants, social halls, hospitals, country clubs and the like. The coffee brewer 12, beneath which the grounds disposal arrangement 10 is maintained in a predetermined fixed position through the intermediary of a positioning and guiding device 14, which is described in greater detail hereinbelow, includes the usual apparatus for heating water from a water supply (not shown) and includes canisters mounted thereon for receiving and storing ground coffee and decaffinated coffee adapted to be administered in measured quantities to specified quantities of hot water for brewing coffee within the brewer 12 and dispensing the coffee into suitable serving pots which may be supported on hot plate located near the lower end of the coffee brewer.

Figure 2:
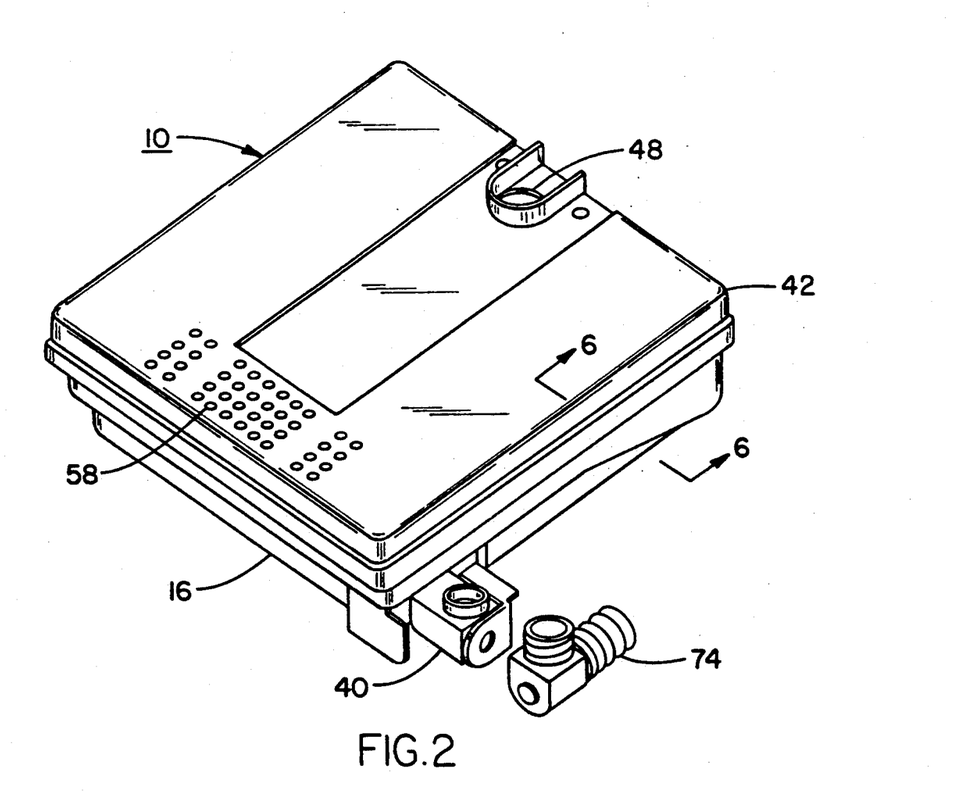
FIG. 2 illustrates a perspective view of the coffee grounds disposal arrangement pursuant to the invention, showing the swivel coupling thereof in its disconnected inoperative position.
Figure 3:
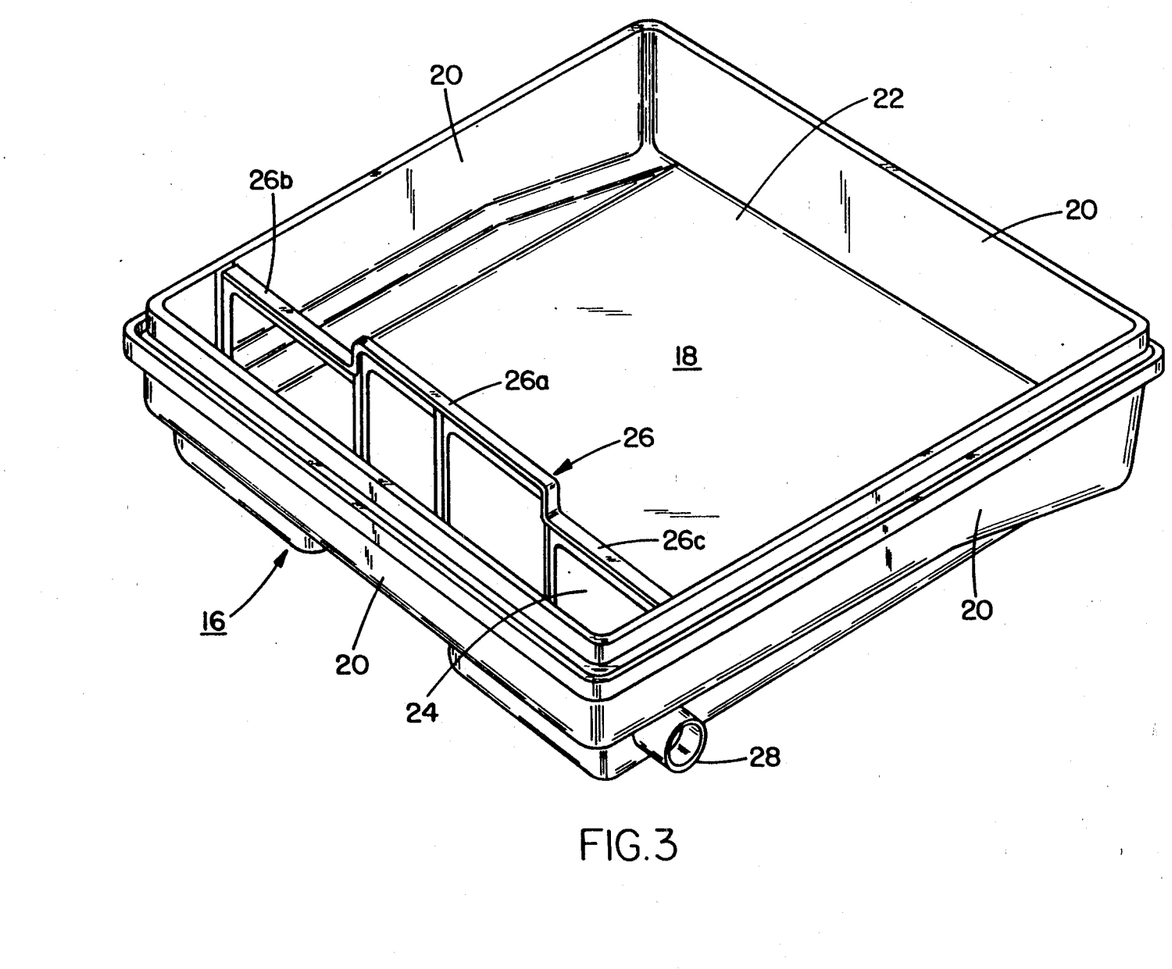
FIG. 3 illustrates a perspective view of the lower receptacle portion of the coffee grounds disposal arrangement, with the swivel coupling omitted therefrom.
Figure 4:
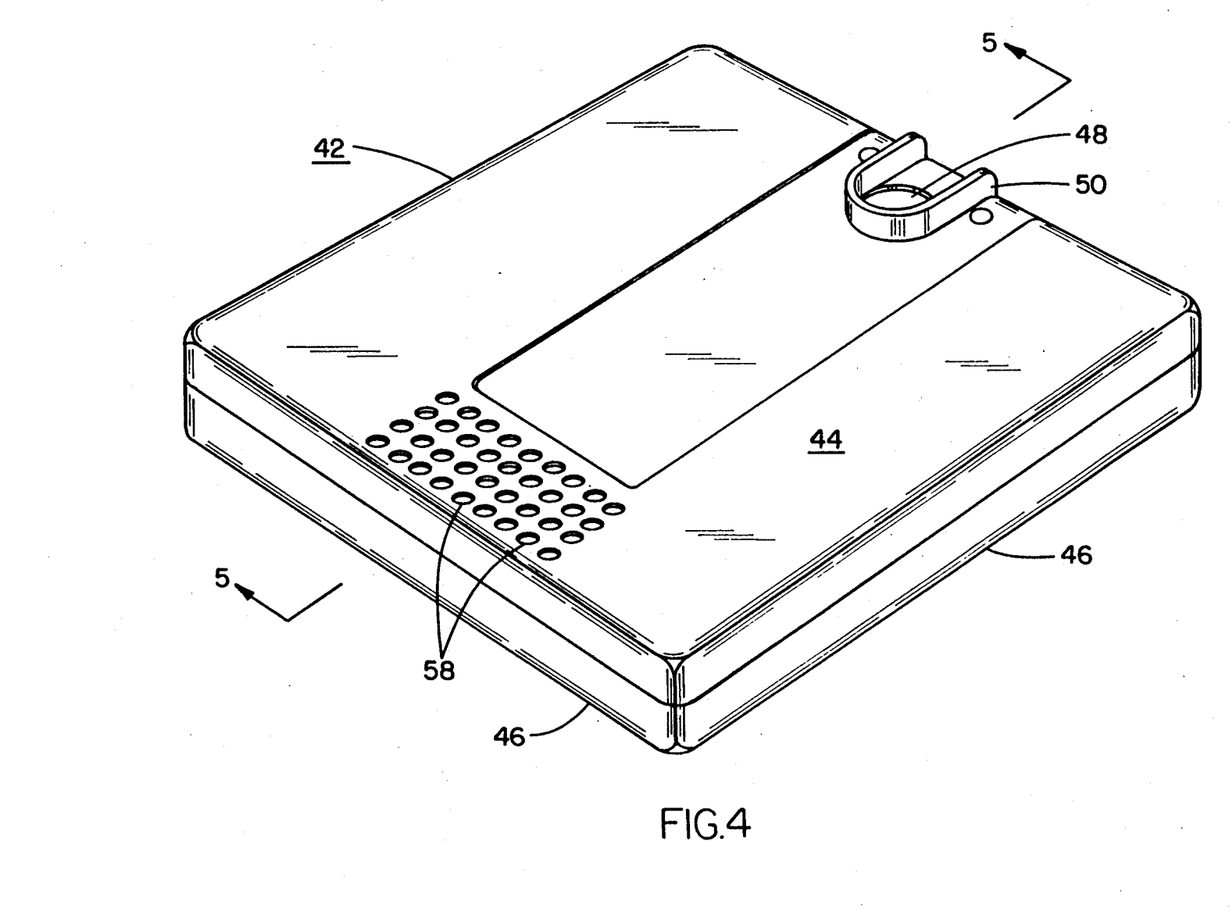
FIG. 4 illustrates a perspective view of a lid member for the coffee grounds disposal arrangement, which is adapted to be positioned on the receptacle as shown in FIG. 3.

As shown more specifically in FIGS. 2 through 4, the coffee grounds disposal unit includes a receptacle 16 having a bottom wall 18 and encompassing upstanding sidewalls 20. In this instance, the entire arrangement is of a generally rectangular configuration, although it may be possible to contemplate other shapes thereof depending upon the particular coffee brewer and applications of the coffee grounds disposal arrangement. The receptacle 16 is divided into a first relatively large-sized compartment 22 which is separated from a smaller compartment 24 through the intermediary of an upright strainer 26. The strainer is provided with a mesh size enabling liquid to readily flow therethrough while preventing the through-passage of wet coffee grounds. The compartment 24 has an outlet connector 28 communicating therewith, and in which a connector 28 may be formed at either or both ends of the compartment 24 although only one of the connectors would be opened depending as to whether a customer desires either a left-hand or right-hand draining operation of the disposal arrangement 10 when the latter is positioned beneath a coffee brewer 12. The outlet connector 28 may be integrally formed with the structure of the receptacle 16, and project out of the sidewall 30 in the shape of a conduit or nipple at a level which is substantially coplanar with the bottom surface of the compartment 24. If desired, the bottom wall 18 of the receptacle 16 may be sloped so as to form an incline to cause a flow of liquid downwardly from the end of compartment 22 which is remote from compartment 24 and in which the lowest level of the bottom 18 is in the compartment 24. The strainer 26 may be fastened to the sidewalls 20 at the opposite ends thereof and to the bottom wall 18 through suitable fasteners, such as screws or the like, so as to be removable and replaceable by other strainers possessing different mesh sizes depending upon the geographical regions and type of water prevalent therein in which it is intended to be used.

Figure 6:
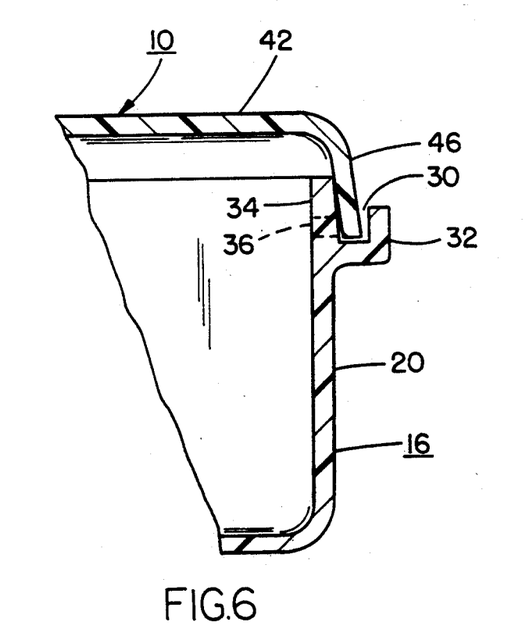
FIG. 6 illustrates, on an enlarged scale, a fragmentary sectional view taken along line 6—6 in FIG. 2.

The circumference of the receptacle 16 is provided along the upper end of each sidewall with a continuous channel structure 30, as shown in specific detail in FIG. 6; the channel structure having a generally U-shaped configuration, and in which the outer lip 32 of the channel projects radially outwardly and upwardly from the plane of each sidewall 20. The inner lip 34 of the channel structure 30, which is an extension of sidewall 20, may be provided with one or more through-holes 36 communicating the bottom region of the channel 30 with the interior of the receptacle 16 for a purpose described in more specific detail hereinbelow.

The outlet connector or conduit 28 projecting from the sidewall 20 and communicating with the bottom of the compartment 24 is adapted to be equipped with a swivel coupling 40 for connection to a drainage hose for the outflow of the hot scavenging or flushing liquid or water from which the spent coffee grounds have been separated by the strainer 26, as is described in detail in connection with FIGS. 7 and 8 of the drawings.

Supported on the receptacle 16 of the coffee grounds disposal arrangement 10 is a lid member 42 possessing a generally flat top surface 44 and surrounding downwardly depending flange structure 46. The lid member 42 is provided towards one edge thereof and centrally between the adjacent edges at that end with an inlet port 48 which is surrounded on at least three sides with an upstanding splash guard 50, the latter of which may be integrally formed with or fastened to the surface of the lid member 42.

Figure 5:
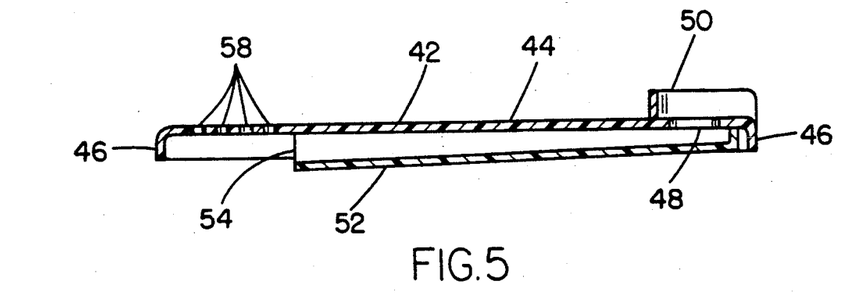
FIG. 5 illustrates, generally diagrammatically, a sectional view taken along line 5—5 in FIG. 4.

The lower surface of the lid member 42, as shown in more specific detail in FIG. 5, is provided with an elongate channel member 52 extending centrally along the lower face of the top surface 44 from below the region of the inlet port 48, at which location the end of the channel is closed, towards the opposite end of the lid member 42 so as to terminate with a channel opening 54 at a location in close proximity to but prior to reaching the strainer structure 26 when the lid member 42 is mounted on the receptacle 16. In essence, the channel 52, which may be of a generally rectangular cross-sectional configuration sloping somewhat downwardly from the inlet port 48 towards the opening 54, when the lid member 42 is positioned on the receptacle 16 extends centrally over the first compartment 22 and terminates shortly prior to reaching the strainer structure 26 so as to leave a gap therebetween. When the lid member is mounted on the receptacle 16, the central portion 26a of the strainer 26 has the upper end thereof contacting the inner surface of the lid top 44, whereas on either side the strainer portions 26b and 26c terminate at a somewhat lower height so as to leave a gap between their upper ends and the interior surface of the lid top plate 44.

When the lid member 42 is mounted on the receptacle 16, the peripheral depending flange portion 46 of the lid has the lower end portion thereof seated in the U-shaped channel 30 formed at the upper ends of each of the sidewalls 20 of the receptacle 16.

The lid member 42 has a plurality of venting apertures 58 formed in the top plate portion 44 located generally ahead of the opening 54 of the channel 52 within a region extending above the second compartment 24 so as to form a vent for the escape of steam generated by the hot scavenging liquid and coffee grounds being conveyed into the arrangement 10 from the coffee brewer 12. Preferably, although not necessarily, provision is made for a vent pattern from approximately forty venting apertures 58 each having a diameter of about 0.281 in.; although other venting aperture sizes and quantities may also be readily employed in conjunction with the present invention.

Figure 7:
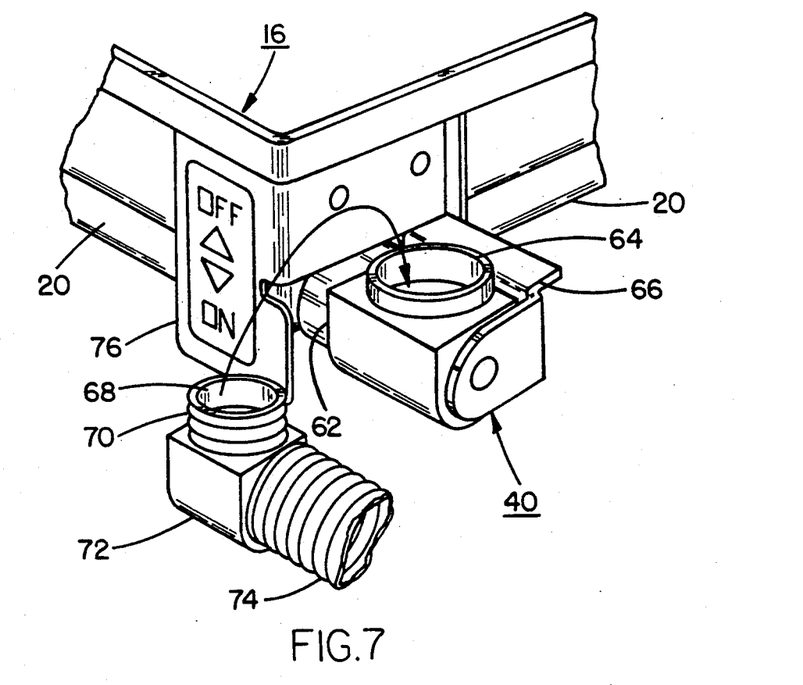
FIG. 7 illustrates the swivel coupling pursuant to the invention, shown in its vertical orientation prior to the connection with uncoupling from a drainage hose.
Figure 8:
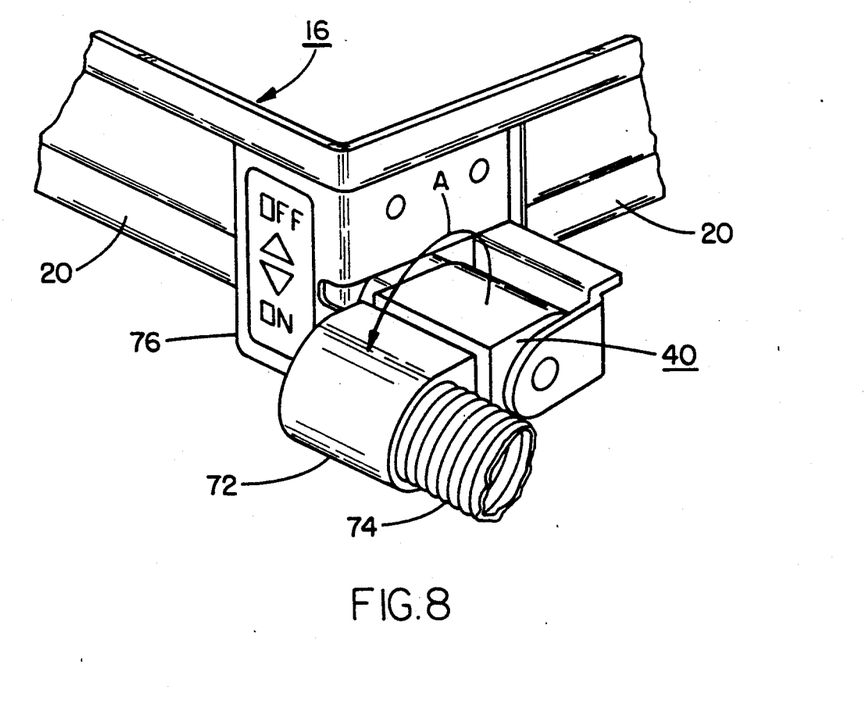
FIG. 8 illustrates the swivel coupling in its horizontally oriented operative position with the drainage hose coupled thereto.

As illustrated in FIGS. 7 and 8 of the drawings the nipple-like outlet conduit 28 for hot liquid which extends from the second compartment 24 outwardly of sidewall 20 of the receptacle 16, has the swivel coupling 40 mounted thereon, as is also illustrated in FIG. 2 of the drawings.

As illustrated in FIG. 7, wherein the swivel coupling 40 is shown in its upright or inoperative vertical orientation, the swivel coupling 40 has a first portion 62 rotatably mountable on the conduit 28, and at right angles thereto includes a second outlet 64 which, in this instance, is shown vertically oriented and located at a level above the bottom level of the compartment 24. The swivel coupling 40 further includes a plate member 66 which is adapted to be swung forwardly in the direction of arrow A as shown in FIG. 8 subsequent to the insertion into outlet 64 of a tubular extension 68 provided with 0-rings 70 and located on a mating coupling member 72 of a drainage hose 74. Hereby, the tubular conduit 68 on the hose connector 72 is insertable into outlet 64 so as to cause the 0-rings 70 to form a sealing engagement therewith, and thereafter as shown in FIG. 8, the entire coupling assembly, together with the hose 74 connected therewith, is pivoted forwardly into a horizontal orientation in the direction of arrow A. For this purpose, a plate member 76 is fastened to the adjacent edge of the sidewall 20 of the receptacle 16, until a protuberance (not shown) on the member 72 which is coaxial with the hose 74 comes into contact with the rear surface of the plate 76, thereby locking the hose 74 to the swivel coupling 40 and preventing it from being pulled outwardly and disengaged therefrom when in the horizontally-oriented operative position shown in FIG. 8. In that position, the opening 64 in the swivel coupling 40 and the conduit 28 communicating with the second compartment 24 of the receptacle 16 are in an essentially coplanar arrangement with each other and with the level of the bottom of surface the compartment 24.

Figure 10:
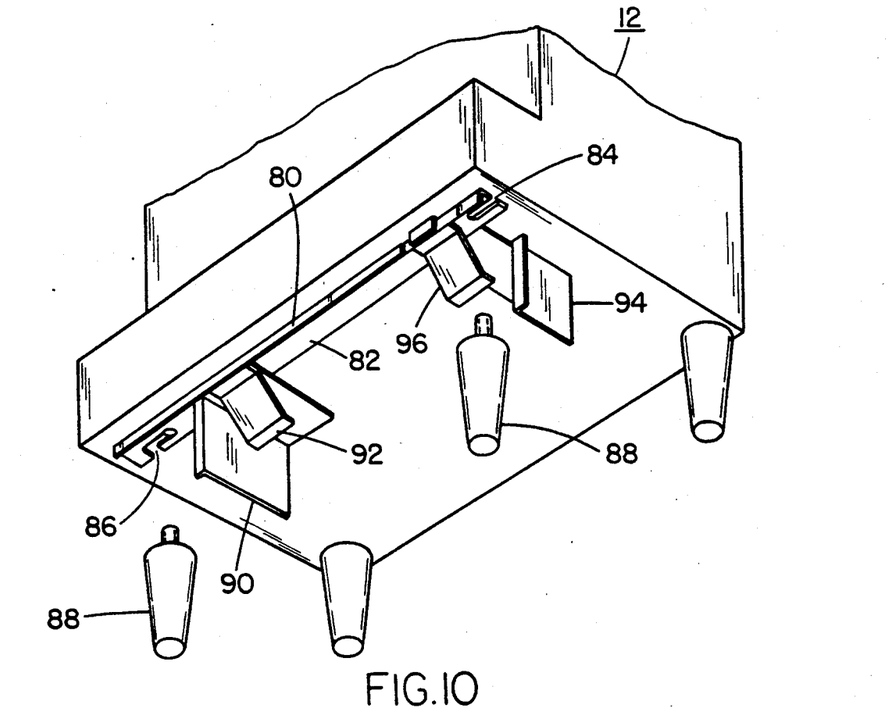
FIGS. 10 and 11 perspectively illustrate the device for positioning and guiding the coffee grounds disposal arrangement into a predetermined position beneath an automatic coffee brewer.
Figure 11:
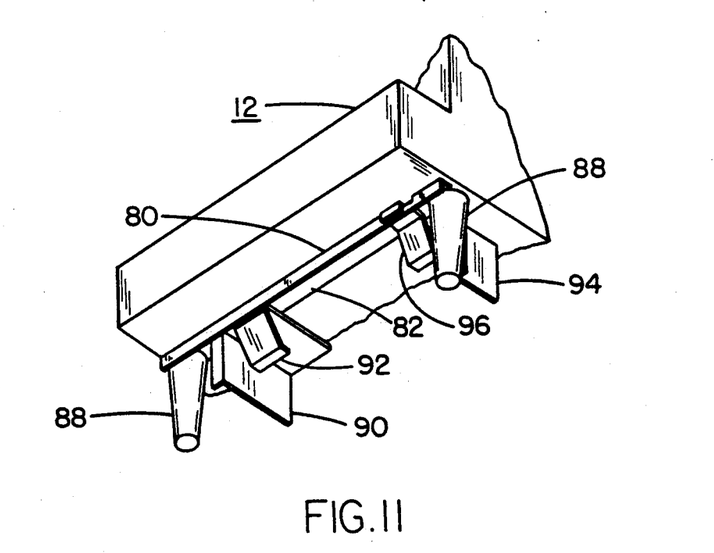

In order to position the entire coffee grounds disposal arrangement or unit 10 in proper waste liquid and coffee grounds-receiving orientation beneath coffee brewer 12; in effect, intermediate the support legs thereof, reference may now be had to FIGS. 10 and 11.

As shown therein, the positioning device 80 for guiding and orienting the coffee grounds disposal arrangement 10 enables the inlet port 48 in the lid member 42 to be in coaxial alignment directly beneath a waste discharge nozzle projecting downwardly from the coffee brewer 12 for receiving the flow of hot scavenging liquid and entrained spent coffee grounds therefrom.

Hereby, the positioning device 80 includes a generally flat plate member 82 having a short angled edge portion, and with plate member 82 being provided at each end with respectively an axial slot 84, and a transverse end then axial L-shaped slot 86 at the opposite end adapted to engage the upper ends of legs 88 from which the coffee brewer 12 is supported in a raised position above a flat support surface or counter top. The configuration of the slots allows for a limited axial adjustment of the arrangement 80 so as to enable the inlet port 48 to be laterally adjusted relative to the waste discharge nozzle on the coffee brewer, and to accommodate differing widths of disposal units 10 with or without channel structures 30.

Fixedly mounted on the plate 82 is a first depending guide plate 90, and adjacently thereto so as to extend above the lid member 42 when the arrangement 10 is slid into position, a downwardly angled biasing or bracket 92.

Similarly, a second guide plate 94 depends from plate 82 and is axially movable within a slot formed in plate 82 so as to allow for limited adjustment. A second downwardly angled bracket 96 is also provided adjacent the plate 94, the guide plates 90, 94 are spaced to guide unit 10 therebetween, and in FIG. 11 the legs are shown screwed to the bottom of coffee brewer 12 so as to cause the positioning device 80 to be fixedly clamped in position beneath the bottom surface of the coffee brewer, and adapted to guidingly receive the coffee grounds disposal arrangement 10.

Figure 1:
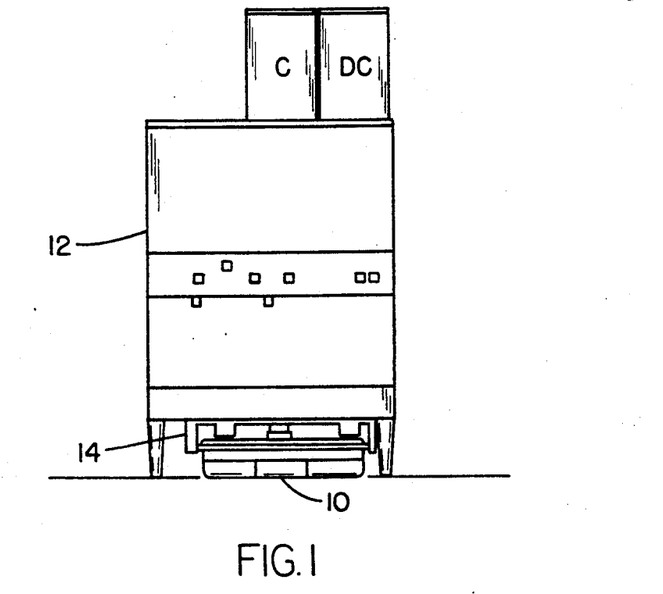
FIG. 1 illustrates generally schematically an automatic coffee brewer with a coffee grounds disposal arrangement constructed pursuant to the invention being arranged thereunder in its operative position.
Figure 9:
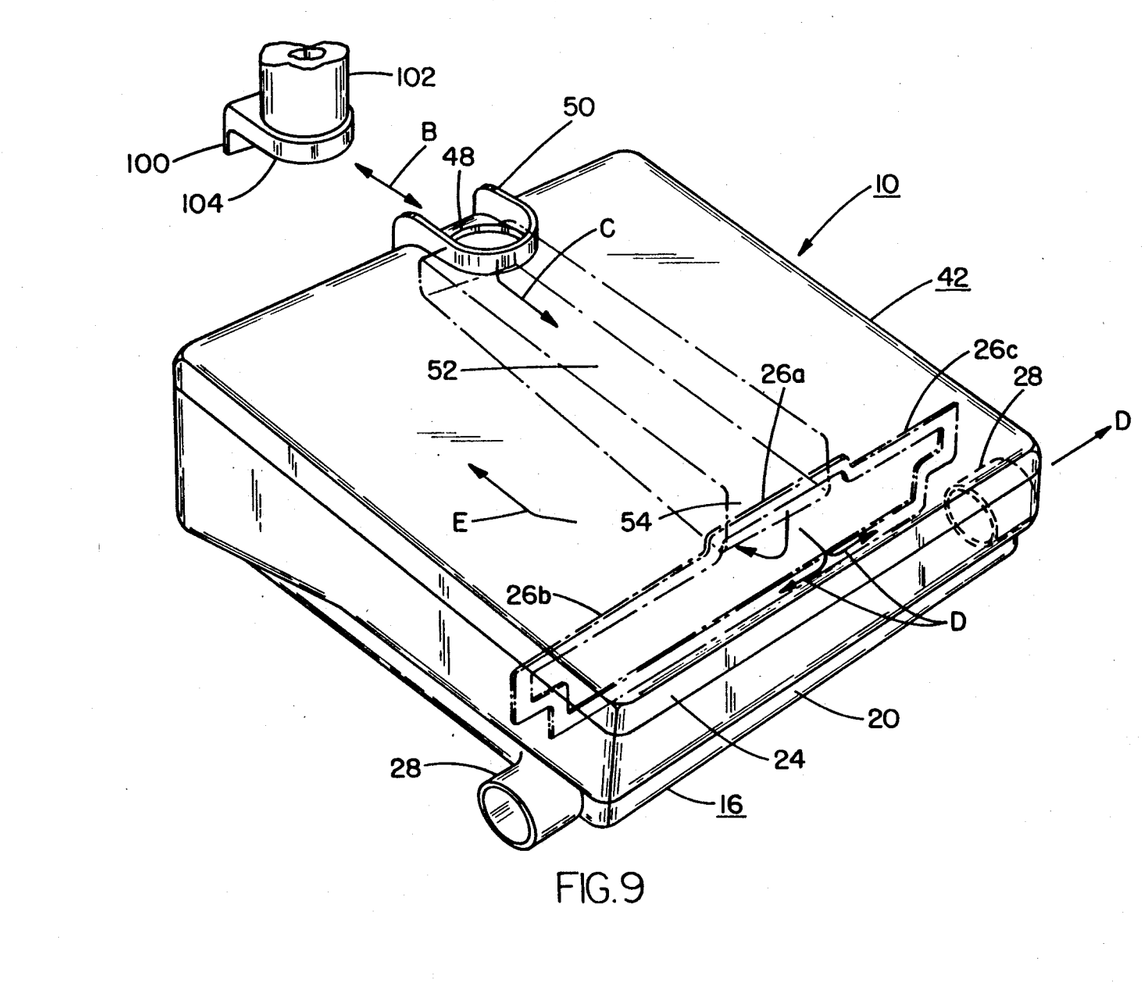
FIG. 9 illustrates diagrammatically the flow path of the hot scavenging liquid and entrained spent coffee grounds through the coffee grounds disposal arrangement.

The operation of the foregoing arrangement is essentially as follows:

An empty, clean coffee grounds disposal arrangement 10 is slid beneath brewer 12, as shown in FIG. 1, with the inlet port 48 facing towards the rear of the coffee brewer, as is more clearly ascertainable from FIG. 9 of the drawing, diagrammatically showing the functioning of the arrangement 10. Hereby, the grounds disposal arrangement 10 is slid in the direction of arrow B, with the sidewalls 20 on the opposite sides thereof being contacted by, respectively, the facing surfaces of the guide plates 90 and 94 of the positioning device 80, until a downwardly extending rear stop 100 located at the lower end of a waste discharge nozzle 102 of the coffee brewer 12 comes into contact with the lid member 42. This will cause a curvilinear shoulder 104 at the lower end of waste discharge nozzle 102 to slide over the inlet port 48 and contact the inner wall surfaces of the splash guard 50, and to align an outlet opening in the discharge nozzle 102 with the inlet port 48 to form an essentially sealed arrangement with regard to the surroundings. Thereafter, when a flow of hot scavenging liquid or water with spent coffee grounds entrained therein is discharged from the coffee brewer 12 into the grounds disposal arrangement 10, it will enter through the inlet port 48 into the channel 52 and then flow therein along the direction of arrow C towards the channel outlet end 54. At that location, in response to the pressure of the liquid-grounds stream, the hot liquid will pass through strainer 26 to enter compartment 24, as shown by the arrows D, whereas the wet spent coffee grounds which are unable to pass through the mesh of the strainer arrangement 26 will be deflected back along the direction of arrows E, so as to collect in the bottom of the first larger-sized compartment 22 of the receptacle 16. Concurrently, the stream of hot liquid or water, after its passage through the strainer 26 and ingress into the second compartment 24, discharges outwardly through the outlet conduit 28 and the swivel coupling 40, which is in the horizontal operative position connected to a drainage hose 74, as shown in FIG. 8, leading to a liquid waste disposal locale, such as a sink or drain port of the facility.

In the event that the first compartment 22 is completely filled with coffee grounds, and further charges of coffee grounds are still conveyed therein from the coffee brewer; for instance, due to an inadvertence or failure of the operator of the coffee brewer to empty the coffee grounds disposal arrangement 10 after a specified interval, the gap which is present above the side strainer portions 27b and 26c and the interior surface of the top plate 44 of lid member 42 will enable the excess coffee grounds to pass over the strainer and to be discharged through the outlet 28 in conjunction with the hot liquid or water in which they are entrained thereby preventing the lid member from being lifted away from the remaining receptacle or clogging of the arrangement with resultant backup of waste into the coffee brewer.

Furthermore, in order to ensure that the coffee grounds disposal arrangement 10 remains in a closed position during operation thereof, when positioned beneath the coffee brewer 12, the downwardly angled bracket members 92 and 96 exert a downwardly acting pressure against the lid member 44.

The steam which is generated by the hot liquid and coffee grounds within the arrangement 10 is basically vented upwardly through the venting apertures 58 which are formed in the lid member 42, and in view of the presence of a hot plate located thereabove in the bottom of the coffee brewer 12, is essentially vaporized without forming a liquid condensate.

Any condensate forming within the lid member 42 and flowing outwardly along the flange surfaces will be collected in the U-shaped channel 30, and possibly may be redirected into the receptacle 16 through the provision of the drain holes 36 connecting the bottom of the channel 30 with the interior of the receptacle 16. This, in effect, will inhibit any condensate formed from flowing outside of the receptacle and unattractively wetting the surface area about the coffee brewer 12.

When it is desired to empty the coffee grounds which have collected in the compartment 22, subsequent to the shutting off of the coffee brewer 12, it is merely necessary to pivot the swivel coupling 40 upwardly into the position shown in FIG. 7, and to disengage the O-ring-equipped connector 68 from the opening 64 of the swivel coupling. This will preclude any residual liquid in the compartment 24 from inadvertently being spilled out of the receptacle, thereby avoiding staining and wetting of the counter top or brewer support surface with such waste liquid.

Thereafter, the unit 10 may be removed, the lid member 42 lifted away from receptacle 16, and the coffee grounds discarded into any suitable waste disposal bin or receptacle. The interior of the receptacle may be washed, the lid member 42 repositioned thereon, the drainage hose 74 reconnected and pivoted downwardly into the horizontal operative position shown in FIG. 8, and the entire disposal arrangement 10 slid back into position between the guide plates 90, 94 and below brackets 92, 96 of the positioning device 80. The coffee brewer 12 is now again a state of readiness for renewed brewing operation thereof.

The structure of the coffee grounds disposal arrangement 10, in essence, the primary components thereof, including the receptacle 16, the lid member 42, the channel 52, and the swivel coupling 40 may also be constituted from a molded thermoplastic material possessing a high resistance to temperature and corrosive materials, such as coffee grounds. Hereby, the thermoplastic materials which may be employed for this purpose can be polystyrene or, alternatively; by way of example only, may consist of a polycarbonate/PET polyester blend sold under the tradename Makroblend DP4-1370 by Moba Corp., Pittsburgh, Pa.; or Cycolac Grade X11 sold by the General Electric Co. Plastics Division, Pittsfield, Mass.; although other plastics may be suitable for this arrangement.

The components of the positioning device 80 which are fastenable to the upper ends of the legs 88 supporting the coffee brewer 12 may be constituted from any suitable corrosion-resistant stainless steel.

From the foregoing it becomes readily apparent that the inventive coffee grounds disposal arrangement enables the simple collection and disposal of spent coffee grounds discharged in conjunction with a flushing or scavenging liquid, such as water, in a hot state from a coffee brewer so as to enable the continual operation thereof in the preparation of fresh coffee brews.

While there has been shown and described what is considered to be a preferred embodiment of the invention, it will of course, be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A coffee grounds disposal arrangement comprising a receptacle having a bottom wall and encompassing sidewalls extending upwardly from said bottom wall; strainer means in said receptacle to separate said receptacle into first and second compartments; a lid member mounted on said receptacle, said lid member including an inlet portion located in a region above said first compartment for conveying a flow thereto of a hot liquid having spent coffee grounds entrained therein from a discharge orifice of a coffee brewing apparatus, venting means in said lid member for venting steam from said hot liquid in said receptacle, said strainer means facilitating flow of said hot liquid therethrough from said first compartment into said second compartment while inhibiting through-passage of said coffee grounds so as to cause said coffee grounds to collect in said first compartment; and outlet means in said second compartment for discharging said hot liquid from said receptacle.

2. An arrangement as claimed in claim 1, wherein said venting means in said lid member comprises a plurality of apertures, said apparatus being located in said lid member generally above said second compartment.

3. An arrangement as claimed in claim 1, wherein a flow channel is located on an interior surface of said lid member extending above said first compartment, said flow channel having a first closed end communicating with said inlet port for receiving said flow of hot liquid and entrained coffee grounds therefrom and a second open end proximate said strainer means for discharging said flow so as to, in cooperation with said strainer means, redirect said coffee grounds into said first compartment while passing said hot liquid through said strainer means into said second compartment.

4. An arrangement as claimed in claim 1, wherein said strainer means comprises an upright perforate plate separating said receptacle into said first compartment having a size substantially larger than the size of said second compartment, said perforated plate having portions of a reduced height to allow for an overflow of excess coffee grounds from said first compartment into said second compartment for discharge with said hot liquid through said outlet connector so as to prevent overfilling of said arrangement with coffee grounds.

5. An arrangement as claimed in claim 4, wherein said perforated plate comprises a mesh strainer having mesh size which is smaller than the size of the particles of the wet coffee grounds.

6. An arrangement as claimed in claim 1, wherein said inlet port in said lid member is located centrally proximate an edge of said lid member which is distant from said second compartment.

7. An arrangement as claimed in claim 1, wherein an upstanding splash shield is formed on said lid member extending about at least a major portion of the circumference of the opening of said inlet port.

8. An arrangement as claimed in claim 1, wherein said lid member comprises a generally flat top plate, a depending peripheral flange structure encompassing said plate having the lower ends of said flange structure seated on the upper ends of the sidewalls of said receptacle to form a closed disposal arrangement.

9. An arrangement as claimed in claim 8, wherein the upper ends of said sidewalls of said receptacle comprise a U-shaped channel configuration receiving the lower end portions of the depending flange structure of said lid member so as to inhibit the outflow of condensate liquid formed from steam generated by said hot liquid between the juncture of the receptacle and lid member.

10. An arrangement as claimed in claim 9, wherein at least one drainage hole connects the interior of said receptacle with the U-shaped channel to redirect excess condensate liquid collected in said channel into said receptacle.

11. An arrangement as claimed in claim 1, wherein the interior surface of the bottom wall of said receptacle is sloped downwardly from said first compartment towards said second compartment to propagate the flow of said hot liquid through said strainer means into said second compartment end and towards said outlet means for discharging said liquid from the arrangement.

12. An arrangement as claimed in claim 1, wherein said outlet means comprises a tubular conduit integrally formed with said receptacle and extending outwardly from said second compartment; a swivel coupling mounted on said tubular conduit for connection to a drainage hose for receiving the liquid from said second compartment and conveying said liquid to a liquid waste disposal site.

13. An arrangement as claimed in claim 12, wherein said swivel coupling has a discharge orifice connectable to said drainage hose and being pivotable into a horizontal orientation so as to be essentially coplanar with the level of the bottom of said second compartment for draining essentially all of the liquid contained therein during operation of the arrangement and being pivotable into a vertical upward orientation to prevent residual liquid from spilling out of said swivel coupling upon separating the drainage hose therefrom.

14. An arrangement as claimed in claim 13, wherein said drainage hose includes a tubular fitting having O-rings fastened thereon for sealingly engaging into the discharge orifice of said swivel coupling.

15. An arrangement as claimed in claim 13, wherein cooperating means on said receptacle and on said swivel coupling latches said drainage hose to said swivel connector in the horizontal operative position of said swivel coupling to prevent inadvertent detachment of said hose from said coupling.

16. An arrangement as claimed in claim 12, wherein said swivel coupling is constituted from a molded thermoplastic material.

17. An arrangement as claimed in claim 1, wherein said lid member and said receptacle are each molded from a high-strength, rigid thermoplastic material which is resistant to high temperatures and impervious to the corrosive action of said hot liquid and coffee grounds.

18. An arrangement as claimed in claim 17, wherein said thermoplastic material consists of polystyrene.

19. An arrangement as claimed in claim 17, wherein said thermoplastic material consists of a polycarbonate—PET polyester blend.

20. An arrangement as claimed in claim 1, wherein said receptacle and lid member are rectangular in configuration.

21. An arrangement as claimed in claim 1, wherein said disposal arrangement is insertable beneath a coffee brewer which is supported on legs in a raised position above a horizontal supporting surface, said arrangement being supported on said surface and extending between the legs of said coffee brewer; comprising positioning means coaxially aligning said inlet port in the lid member with a waste discharge nozzle for hot liquid and entrained spent coffee grounds depending downwardly from said brewer intermediate said legs.

22. An arrangement as claimed in claim 21, wherein said positioning means for said disposal arrangement comprises a horizontal plate member extending laterally between two of said legs on the brewer intermediate which said arrangement is inserted below said plate member, said plate member including means at each end thereof for engaging the upper ends of the respective legs; means on said legs for locking the ends of said plate member to said legs; and means on said plate member for guiding contacting opposing sidewalls of the receptacle and the upper surface of said led member for orienting said arrangement relative to said coffee brewer.

23. An arrangement as claimed in claim 22, wherein said contacting means on said plate member comprises a first fixedly mounted vertical depending guide plate and contacting one sidewall of the receptacle and bracket means contacting the top surface of the lid member and a second vertically depending guide plate and bracket mounted on said plate member for limited axial adjustment for contacting respectively the opposing sidewall of the receptacle and the top surface of the lid member.

24. An arrangement as claimed in claim 23, wherein the opposite ends of said horizontal plate member include slots, the upper ends of said legs being engageable in said respective slots so as to allow for limited axial adjustment of said plate member between said legs; and means on said legs for latching said plate member in position.

25. An arrangement as claimed in claim 24, wherein said latching means comprises threaded sleeves on said legs for locking the ends of said plate member between the upper ends of said threaded sleeves and a bottom plate on said coffee brewer.

26. An arrangement as claimed in claim 21, wherein said positioning means for said disposal arrangement is constituted from stainless steel.

27. An arrangement as claimed in claim 1, wherein said hot liquid consists of water utilized to scavenge spent coffee grounds from a coffee brewer.

28. An arrangement as claimed in claim 1, wherein steam exiting from said venting means in said lid member is evaporated by a hot plate on a coffee brewer positioned above said arrangement.

* * * * *